US007051013B2

(12) United States Patent
Horman et al.

(10) Patent No.: US 7,051,013 B2
(45) Date of Patent: May 23, 2006

(54) DATABASE DIAGNOSTIC SYSTEM AND METHOD

(75) Inventors: Randall W. Horman, Mississauga (CA); Sam S. Lightstone, Toronto (CA); Gary Valentin, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 10/180,683

(22) Filed: Jun. 25, 2002

(65) Prior Publication Data

US 2003/0065644 A1 Apr. 3, 2003

(30) Foreign Application Priority Data

Sep. 28, 2001 (CA) .................................... 2357937

(51) Int. Cl.
*G06F 17/30* (2006.01)
(52) U.S. Cl. .......................................... 707/2; 707/102
(58) Field of Classification Search .............. 707/1–10, 707/100–104.1, 200–205
See application file for complete search history.

(56) References Cited

U.S. PATENT DOCUMENTS

| | | | |
|---|---|---|---|
| 5,537,590 A * | 7/1996 | Amado ............................ | 707/2 |
| 5,598,559 A | 1/1997 | Chaudhuri .................... | 395/602 |
| 5,706,494 A | 1/1998 | Cochrane et al. ............ | 395/602 |
| 5,819,255 A | 10/1998 | Celis et al. ..................... | 707/2 |
| 5,822,749 A | 10/1998 | Agarwal ......................... | 707/2 |
| 5,875,334 A | 2/1999 | Chow et al. ................. | 395/705 |
| 5,918,232 A | 6/1999 | Pouschine et al. .......... | 707/103 |
| 6,016,394 A | 1/2000 | Walker ......................... | 395/701 |
| 6,021,405 A | 2/2000 | Celis et al. ..................... | 707/2 |
| 6,044,366 A | 3/2000 | Graffe et al. | |
| 6,944,366 B1 | 3/2000 | Graffe et al. .................. | 707/2 |
| 6,801,903 B1 * | 10/2004 | Brown et al. .................. | 707/2 |

OTHER PUBLICATIONS

Chengwen Liu and Andrei Ursu, *A Framework for Global Optimization of Aggregate Queries*, Proceedings of the Sixth International Conference on Information and Knowledge Management, 1997, pp. 262-269.

Ambuj Shatdal and Jeffrey F. Naughton, *Adaptive Parallel Aggregation Algorithms*, SIGMOD Record, vol. 24, No. 2, pp. 104-114, Jun. 1995.

J. Bradley, *Application of SQL/N to the Attribute-Relation Associations Implicit in Functional Dependencies*, International Journal of Computer & Information Sciences, vol. 12, No. 2, pp. 65-86, Apr. 1983.

(Continued)

*Primary Examiner*—Mohammad Ali
(74) *Attorney, Agent, or Firm*—Sawyer Law Group LLP (57) ABSTRACT

The present invention is directed towards a diagnostic system for a database system. The diagnostic system includes a grouping module for assigning a grouping identifier to each query received by the database system; and a statistics collection module. The statistics collection module includes a query processing statistics module for obtaining processing statistics corresponding to each query; a group statistics compilation module for compiling processing statistics for each query by the query's grouping identifier; and group data storage for storing compiled processing statistics. A method is also disclosed for generating database diagnostic data.

20 Claims, 6 Drawing Sheets

OTHER PUBLICATIONS

A.C. Bloesch and T.A. Halpin, *Conceptual Queries using ConQuer-II,* Conceptual Modeling—ER '97, 16th International Conference on Conceptual Modeling Proceedings, pp. 113-126, Published: Berlin, Germany, 1997.

W. Paul Yan and Paul Larson, *Data Reduction Through Early Grouping,* Department of Computer Science, University of Waterloo, Waterloo, Ontario, Canada pp. 1-9, 1994.

D. Chatzianotoniou and K.A. Ross, *Groupwise Processing of Relational Queries,* Proceedings of the Twenty-Third International Conference on Very Large Databases, pp. 476-485, Published: San Francisco, CA 1997.

Patrick O'Neil and Dallan Quass, *Improved Query Performance with Variant Indexes,* SIGMOD Record, vol. 26, No. 2, pp. 38-49, Jun. 1997.

Andreas Bauer and Wolfgang Lehner, *The Cube-Query-Language (CQL) for Multidimensional Statistical and Scientific Database Systems,* Database Systems for Advanced Applications '97, Proceedings of the Fifth International Conference, pp. 263-272, Published: Singapore, 1997.

Guozhu Dong, et al., *Local Properties of Query Languages,* Theoretical Computer Science, vol. 239, No. 2, pp. 277-308, May 28, 2000.

Andrew Eisenberg, *New Standard for Stored Procedures in SQL,* SIGMOD Record, vol. 25, No. 4, pp. 81-88, Dec. 1996.

David A. Kellogg, *Optimising Queries,* Computer Systems Europe, pp. 53-56, May 1989.

Surajit Chaudhuri and Kyuseok Shim, *Optimizing Queries with Aggregate Views,* Advances in Database Technology—EDBT '96, 5th International Conference on Extending Database Technology Proceedings, pp. 167-183, Published: Berlin, Germany, 1996.

Alon Y. Levy and Inderpal S. Mumick, *Reasoning with Aggregation Constraints,* Advances in Database Technology—EDBT '96, 5th International Conference on Extending Database Technology Proceedings, pp. 514-534, Published: Berlin, Germany, 1996.

Piyush Goel and Bala Iyer, *SQL Query Optimization: Reordering for a General Class of Queries,* SIGMOD Record, vol. 25, No. 2, pp. 47-56, Jun. 1996.

Umeshwar Dayal, *Of Nests and Trees: A Unified Approach to processing Queries that Contain Nested Subqueries, Aggregates, and Quantifiers,* Proceedings of the 13th International Conference on Very Large Data Bases, 1987 13th VLDB, pp. 197-208, Published: Los Altos, CA, 1987.

Don Chamberlin, *Super Groups DB2 Database,* DB2 Magazine, vol. 3, No. 4, pp. 49-50, 52, 54-55, 1998.

\* cited by examiner

FIG. 1

SAMPLE SQL QUERIES

(Q1) SELECT COUNT(*) FROM CARS WHERE MODEL='mustang' AND COLOUR='red';

(Q2) SELECT COUNT(*) FROM CARS WHERE MODEL='viper' AND COLOUR='silver';

(Q3) SELECT OWNER_NAME FROM CARS WHERE LICENSE_PLATE='ACTC403';

(Q4) SELECT COUNT(*) FROM CARS;

GROUP DATA STORAGE

| Group ID | Sample SQL Query | No. of Queries | CPU Time (sec) | Total Sort Time (sec) | Reads | Writes |
|---|---|---|---|---|---|---|
| 39 | SELECT COUNT(*) FROM CARS WHERE MODEL='mustang' AND COLOUR='red' | 5000 | 9348 | 0 | 65663 | 0 |
| 19 | SELECT OWNER_NAME FROM CARS WHERE LICENSE_PLATE= 'ACTC403' | 3000 | 20 | 15 | 92 | 0 |
| 2 | SELECT COUNT(*) FROM CARS | 1 | 47 | 33 | 3 | 34 |
| ... | ... | ... | ... | ... | ... | ... |

DATABASE DIAGNOSTIC SYSTEM AND METHOD

CROSS-REFERENCE TO RELATED APPLICATION

This application claims benefit under 35 USC 119 of Canadian Application Ser. No. 2,357,937 filed Sep. 28, 2001.

FIELD OF THE INVENTION

The present invention relates to the field of database management systems generally, and in particular, to diagnostic tools for structured query language (SQL) database engines.

BACKGROUND OF THE INVENTION

In the world of SQL database engines, seemingly small inefficiencies in processing an individual database query may rapidly become significant if the inefficiency affects thousands or tens of thousands of similar queries. As a result, diagnosing and resolving such inefficiencies can be of substantial importance. For greater clarity, while the term "query" is used throughout this document, it should be understood that this term is also intended to refer to any type of SQL statement, including statements that insert, delete or modify data. As will be understood by one skilled in the art, such statements are commonly referred to as "SQL statements" or DML (data manipulation language).

Although typically most database applications will receive at least some queries which share common attributes, for certain database applications many queries are of a standard or routine type. For example, in the banking industry, particularly with automated teller machines (ATMs) and credit card purchase processing, many routine SQL queries accessing basic account information will be substantially similar. Accordingly, the applicants have recognized a need for a system and methodology for efficiently grouping similar database queries and compiling processing statistics for each such group for diagnostic purposes. The present invention addresses such a need.

SUMMARY OF THE INVENTION

The present invention is directed towards a diagnostic system for a database system. The subject diagnostic system includes a grouping module for assigning a grouping identifier to each query received by the database system; and a statistics collection module. The statistics collection module in turn includes a query processing statistics module for obtaining processing statistics corresponding to each query; a group statistics compilation module for compiling processing statistics for each query by the query's grouping identifier; and group data storage for storing compiled processing statistics.

The subject invention is also directed towards a program product stored on a computer readable medium. The program product includes a grouping module for assigning a grouping identifier to each query received by a database system; and a statistics collection module. The statistics collection module in turn includes a query processing statistics module for obtaining processing statistics corresponding to each query; a group statistics compilation module for compiling processing statistics for each query by the query's grouping identifier; and group data storage for storing compiled processing statistics.

The present invention is further directed towards a method of generating database diagnostic data comprising the following steps:
1. receiving a database query;
2. generating a query execution plan corresponding to the query;
3. generating a signature correlated to the query execution plan;
4. creating a group statistics table;
5. obtaining processing statistics to the query; and
6. storing the processing statistics in the group statistics table correlated to the signature.

DETAILED DESCRIPTION

This invention relates to the field of database management systems generally, and in particular, to diagnostic tools for structured query language (SQL) database engines. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
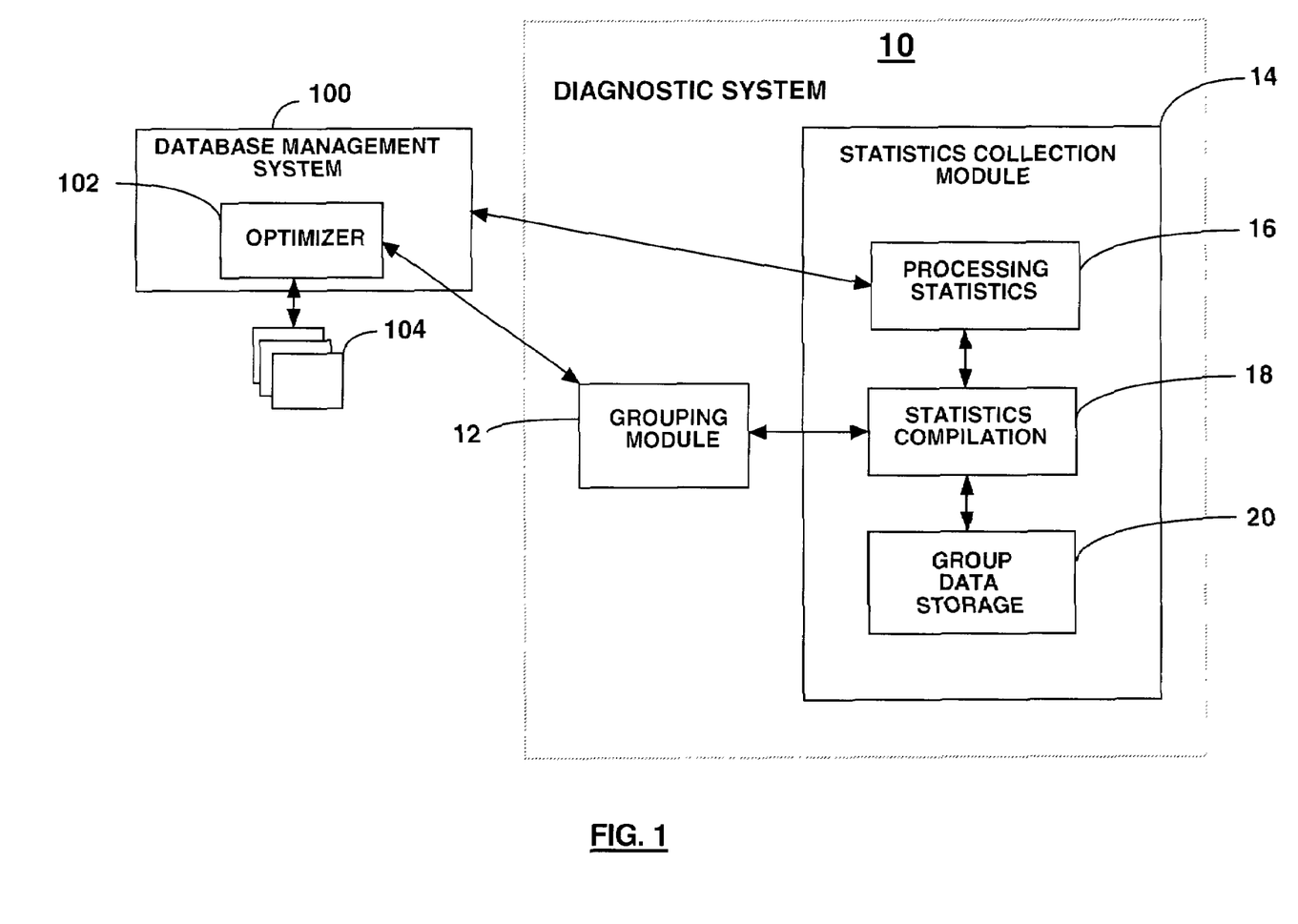
FIG. 1 is a schematic diagram of a database diagnostic system made in accordance with the present invention.

Referring to FIG. 1, illustrated therein is a preferred embodiment of the database diagnostic system of the subject invention. The system, shown generally as 10, comprises a grouping module 12 and a statistics collection module 14. The diagnostic system 10 is intended to interact with, and preferably is incorporated into, a database management system, shown generally as 100 which includes a query optimizer 102 and a database of data 104. In general, the diagnostic system 10 and database system 100 comprise software and data implemented on a hardware infrastructure.

As will be understood, the database management system 100 is configured to receive database queries (typically in the form of SQL) and return data in response to each query.

Figure 2A:
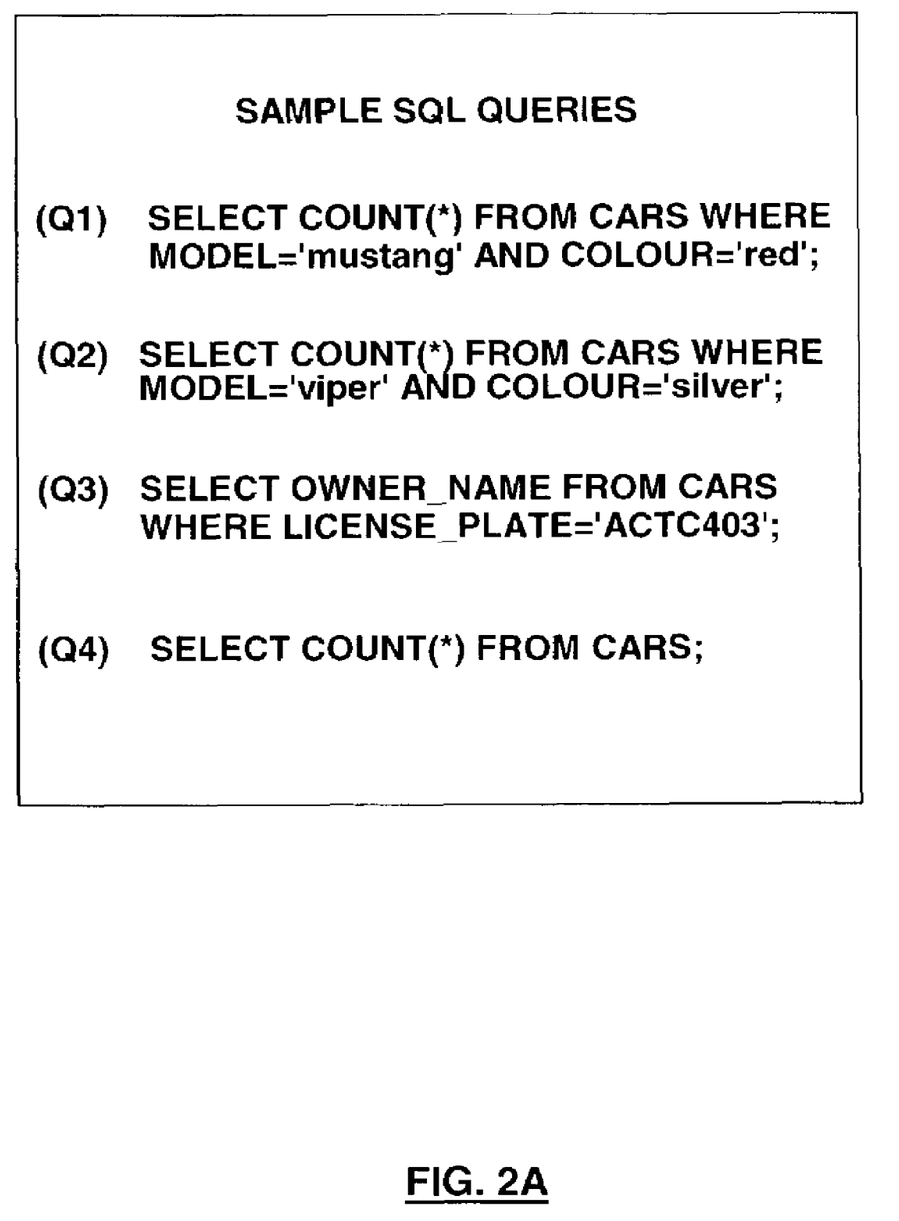
FIG. 2A is a table of sample SQL queries.

FIG. 2A illustrates four different sample SQL queries which might be entered into an automobile registration database. The first query, Q1 is intended to determine how many red Mustangs are listed in the database. Similarly, the second query, Q2 is aimed at determining the number of silver Vipers in the database. The third query, Q3 is seeking the registered owner of a vehicle having the license plate number "ACTC403". The fourth query, Q4, determines the number of cars in the database.

In general, there may be numerous techniques for locating and retrieving the data requested by the query from the database 104. However, these different methods for obtaining the data are not uniformly efficient with respect to their use of resources (eg. processing time, memory, I/O (input/output) accesses). Accordingly, the database management system 100 is provided with a query optimizer 102 for determining an acceptably efficient method for retrieving the requested data, and generating a corresponding query execution plan (QEP). The QEP will typically be in the form of binary-encoded instructions (executed by the database system 100) for implementing a sequence of operations to resolve the SQL query.

There are two common types of optimizers 102: cost-based optimizers and rule-based optimizers. Cost-based optimizers generate different possible QEPs for a query and estimate the processing cost for each possible QEP in terms of estimated resource usage (e.g. CPU data processing time, data storage requirements). Generally the cost is reflected in a single number, and the QEP with the lowest cost is selected as the optimal QEP for answering the query.

In contrast, rule-based optimizers determine an optimal QEP for answering a query through reference to defined optimization rules. Depending on the nature of the query, different optimization rules will operate to generate the optimal QEP.

For greater clarity, it should be understood that while the term "optimal" is used herein in reference to the QEP generated by the optimizer 102, "optimal" is not intended to indicate that the generated QEP is the "best" in an objective sense.

Figure 2B:
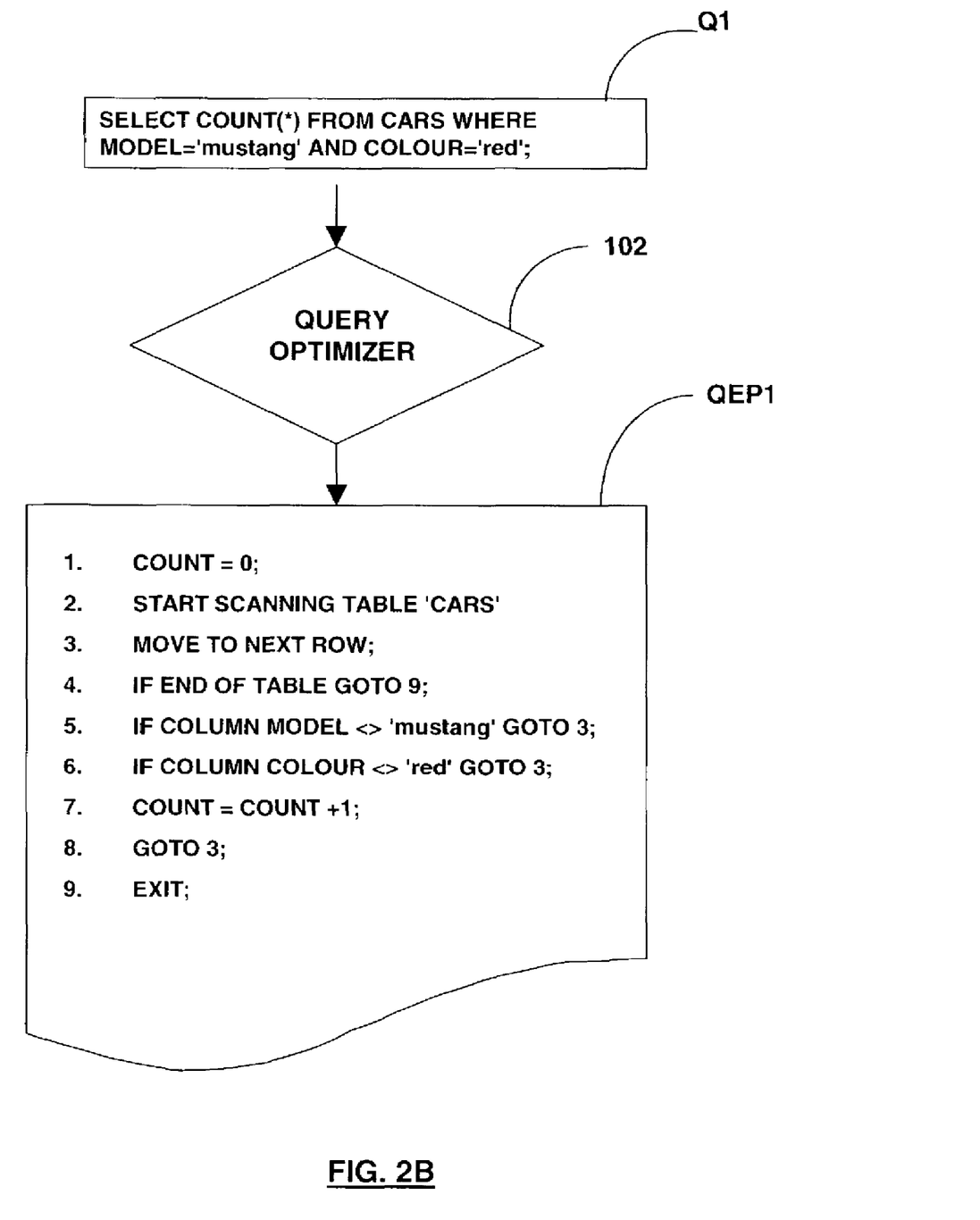
FIG. 2B is a chart illustrating a query execution plan corresponding to the first query of FIG. 2A.

Referring now to FIG. 2B, illustrated therein is an example of a QEP, referred to as QEP1, in pseudo-code as generated by the optimizer 102 from the original query, Q1.

As will be understood, the function of the grouping module 12 is to identify similar SQL queries and group them together for analysis. Preferably, SQL queries are grouped together if they share certain predefined properties, such as: (a) they access data from the same data sources (e.g. indexes, tables and materializations); (b) they are executed using substantially identical QEPs; and (c) they are executed in similar environments (e.g. possess identical CPU parallelism; disk parallelism; disk constants—throughput, overhead; average buffering memory available; average number of connected applications; sort memory available; lock memory available; and CPU performance).

By appropriately grouping SQL queries together, each query in the group will preferably have the same data access patterns and will have the same patterns of resource consumption. As a result, processing inefficiencies affecting one query will likely similarly affect the entire group. Such inefficiencies may include insufficient bufferpool memory, incomplete indexing data, serialized I/O, and excessive sorting.

The grouping module 12 is coupled to receive data from the query optimizer 102 in order to generate a grouping identifier or signature to be assigned to the query.

The grouping module 12 may be configured to receive the optimal QEP from the optimizer 102. The optimizer 102 may be a cost-based or a rule-based optimizer. Once an optimal QEP has been received, the grouping module 12 may then generate a grouping identifier or signature for the query by taking the first "word" of binary encoded instruction in the QEP and successively "folding" it into subsequent words, until a final signature word results.

Figure 2C:
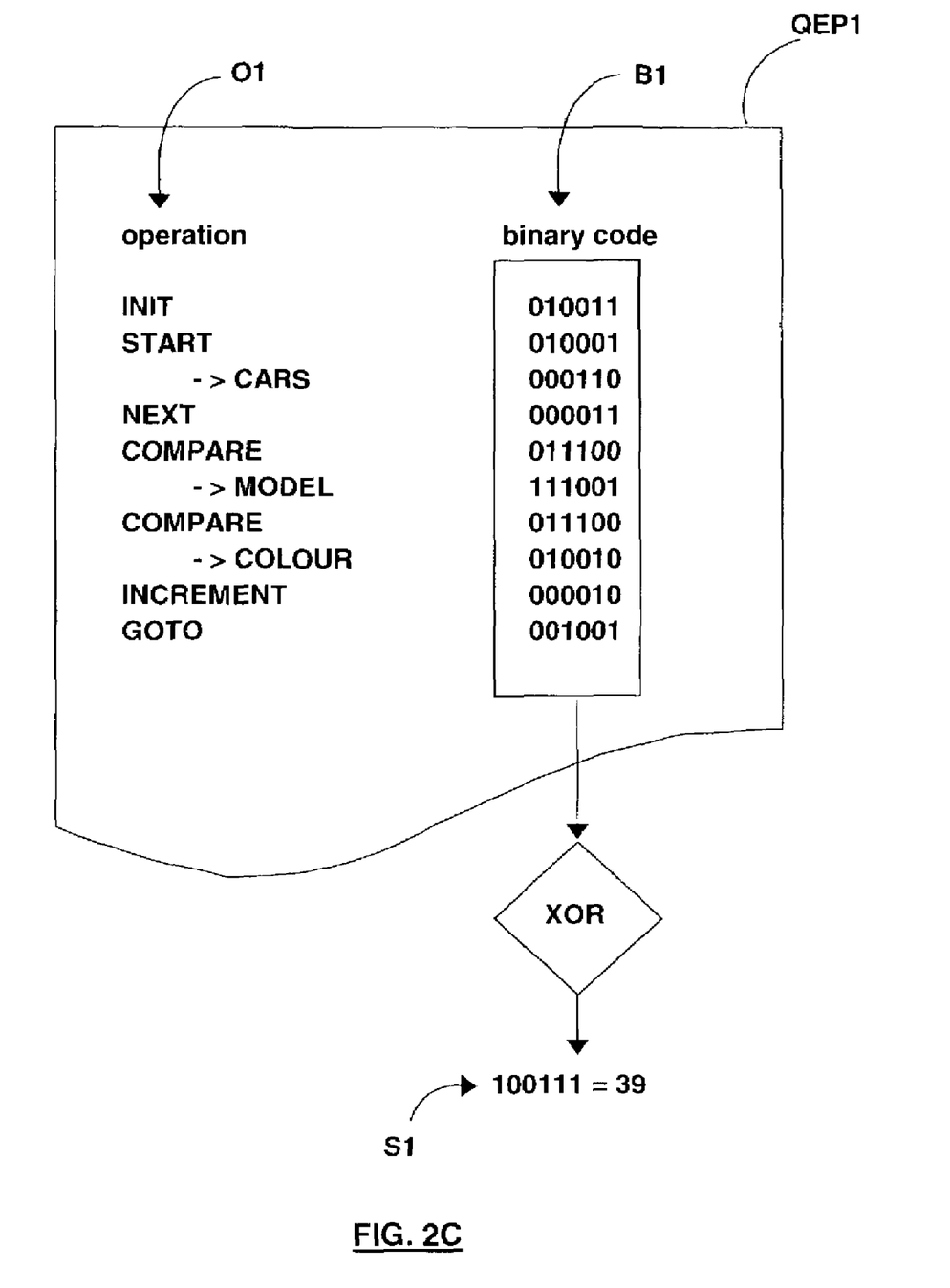
FIG. 2C is a chart illustrating a binary coding corresponding to the query execution plan of FIG. 2B.

By way of illustration, FIG. 2C shows the binary coding B1 corresponding to the various operations O1 carried out by the database system 100, pursuant to the query execution plan, QEP1. As will be understood, generally the specific data sought by the query (e.g. "Mustang and Ared") is not included in the binary coding of the QEP, unless patterns with respect to certain data have been noted and will serve as a useful grouping factor for diagnostic purposes.

As will be understood by one skilled in the art, although 6-bit words have been depicted for illustrative purposes in the binary coding B1, 32-bit words are commonly used in database management systems.

As noted above, the 6-bit words of the execution plan QEP1 are successively folded in together to form a signature or group identifier. The folding in may be accomplished by numerous different techniques including linear feedback shift register (LFSR) and CRC32 checksum, which involves applying the logical operator, XOR ("exclusive OR"), to the binary words. The result may be further refined (if necessary, depending on the application) by folding in identifiers for the tables and auxiliary objects (such as indexes and summary tables) which are accessed by the QEP during processing.

XORing the 6-bit words in the binary code B1, results in a binary signature S1 of 100111, which translates to 39 in decimal numerals. The following sample signatures correspond respectively to the queries Q1, Q2, Q3 and Q4 listed on FIG. 2A (S1): 100111=39
(S2): 100111=39
(S3): 010011=19
(S4): 000010=2

Because the signatures S1 and S2 are identical, the queries Q1 and Q2 may be considered sufficiently similar to be grouped together for diagnostic purposes. The queries S3 and S4 do not match any of the other queries in the group, and accordingly the queries Q3 and Q4 will be grouped separately.

As will be understood, the degree of uniqueness of the signature for a query will be dependent upon the algorithm used by the grouping module 12 to generate and assign the signature. Accordingly, the uniqueness of the signature (and more specifically, the algorithm for generating the signature) may be adjusted as required for specific database systems 100.

If the optimizer 102 is a cost-based optimizer, instead of calculating the signature in the manner discussed above, the grouping module 12 may simply retrieve the resource cost calculated for the optimal QEP from the optimizer 102 and assign the cost as the signature/group identifier for the query Q1.

Referring back to FIG. 1, the statistics collection module 14 preferably includes a query processing statistics module 16, a group statistics compilation module 18, and a group data storage 20. The query processing statistics module 16 is operatively coupled to the database system 100, to retrieve processing statistics related to actual resource usage by the database system 100 in resolving the query Q1.

The group statistics compilation module 18 compiles and stores the query processing statistics in the group data storage 20.

Figure 2D:
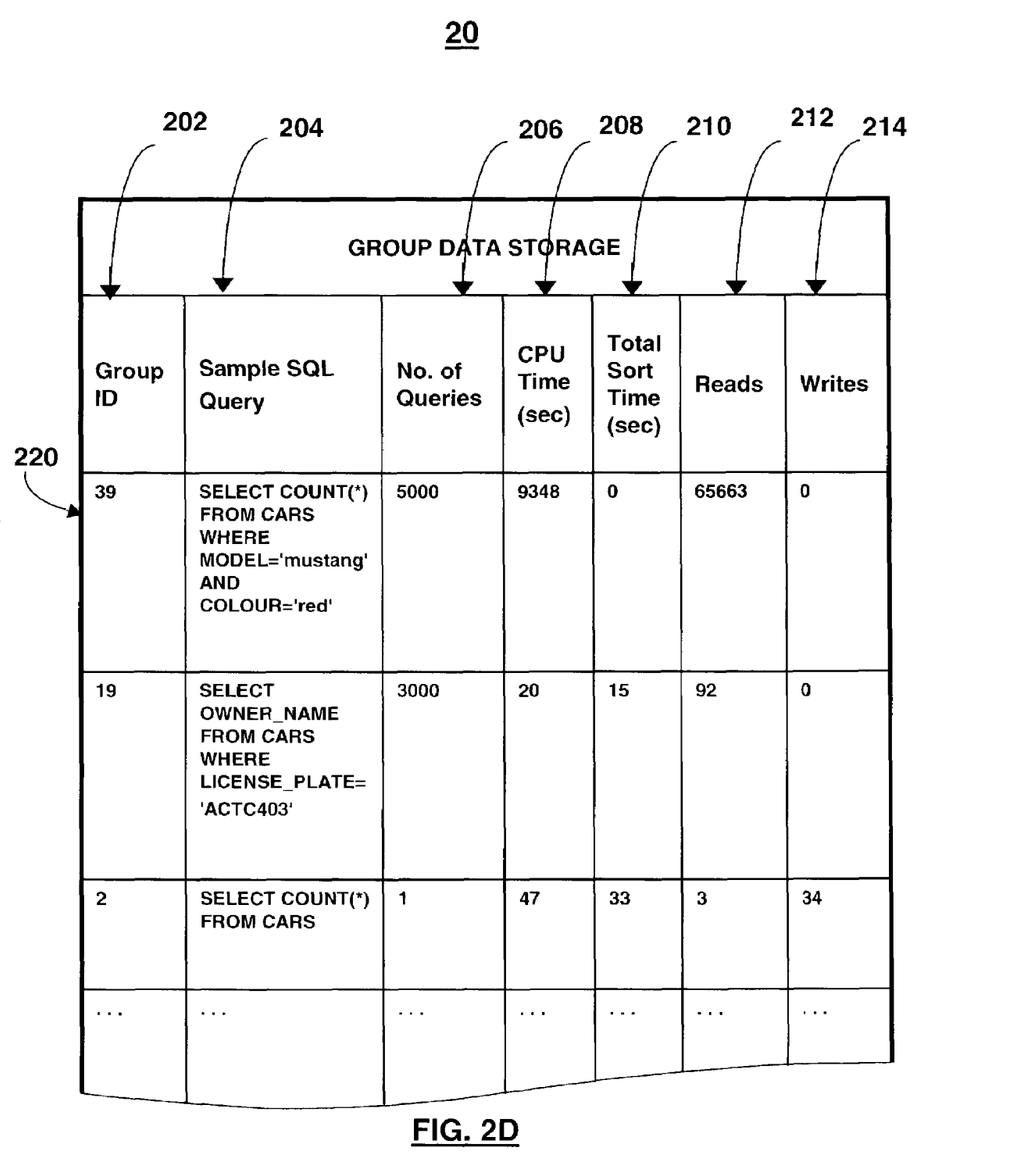
FIG. 2D is a group data storage table of the diagnostic system of FIG. 1.

As shown in FIG. 2D, the group data storage 20 stores query data correlated by group identifier 202. The stored data typically includes a sample SQL query 204 for the group, the number of queries 206 in the group, total CPU processing time 208 for all queries in the group, total sort time 210 for all queries in the group, total number of data read requests 212 and write requests 214. It should be noted that while only four common processing statistics 208, 210, 212, 214 have been selected for illustration on the data storage chart 20, for diagnostic purposes many different types of statistical data may be compiled relating to query processing. Such statistics often include: locks held, total sorts, index reads, index writes, rows inserted, rows deleted, rows updated and rows selected, but such listing is not intended to be comprehensive.

As will be understood, once a signature has been generated for a query, and the query has been resolved by the database system 100, the group statistics compilation module 18 retrieves the group identifier for the query from the grouping module 12, and also retrieves the processing statistics 208 for the query from the database system 100. The compilation module 18 searches the data storage 20 to locate the group sharing the query's group identifier 202. Once the group is located, the number of queries data 206 is increased by one, and the other processing statistics for the query are added to the group statistics 208, 210, 212, 214. If no corresponding group is located, the data storage 20 creates a new group entry, storing the query as the group's sample query 204, and the query's processing statistics data 208, 210, 212, 214, as will be understood.

Referring briefly to the sample data on the data storage 20, the total CPU processing time 208 (and correspondingly the average CPU processing time for each query) for the group 220 having the group identifier "39" is markedly higher than for other groups. While not conclusive, such a disparity in resource usage might indicate a processing inefficiency.

Preferably, the compilation module 18 updates the data in the group data storage 20 in real time, ie. as each query is processed.

Figure 3:
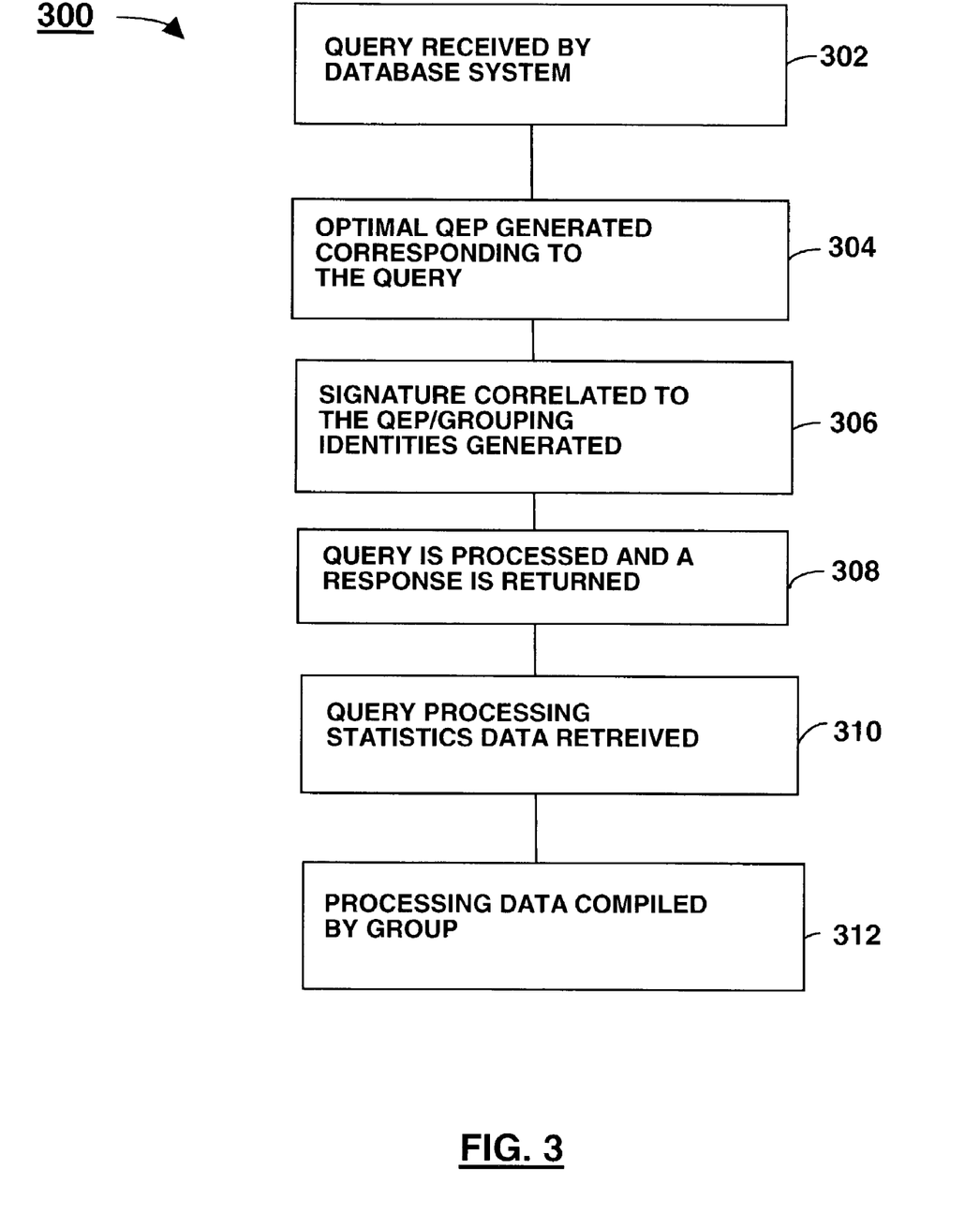
FIG. 3 is a flow chart showing a database diagnostic method employed using the diagnostic system of the present invention.

FIG. 3 illustrates the steps of the method 300 to generate database diagnostic data carried out by the database system 100 and the diagnostic system 10 made in accordance with the subject invention.

The database 100 first receives a database query, for example, as a result of a user requesting a cash withdrawal from a bank account at an ATM. (Block 302) Upon receipt of the query, the optimizer 102 generates an optimal QEP corresponding to the query. (Block 304) The grouping module then generates a signature correlated to the QEP. The signature/group identifier may correspond to the cost assigned to the optimal QEP (if a cost-based optimizer is used), or may be calculated based on the operational steps set out in the QEP. (Block 306) In accordance with the QEP, the query is then processed and a response is returned. (Block 308) The query processing statistics module 16 then retrieves processing statistics data from the database system 100 for the query (Block 310), and the compilation module 18 compiles the processing data by group in the group data storage 20 (Block 312).

It should be understood that while the diagnostic system 10 could operate continuously with the operation of the database system 100, in general the diagnostic system 10 will only periodically be activated to compile diagnostic data.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A diagnostic system for a database system, the diagnostic system comprising:

a query optimizer operable to determine a query execution plan corresponding to each query received by the database system;

a grouping module operable to generate a corresponding grouping identifier for each query based on the corresponding query execution plan and assign the corresponding grouping identifier to each query; and a statistics collection module coupled to the grouping module, the statistics collection module including, a query processing statistics module operable to obtain processing statistics corresponding to each query;

a group statistics compilation module operable to compile the processing statistics for each query by the query's grouping identifier;

a group data storage operable to store the compiled processing statistics; and wherein:

the group statistics compilation module compiles the processing statistics for each query by the query's grouping identifier including, locating a group within the group data storage sharing a grouping identifier corresponding to the grouping identifier associated with a given query and updating processing statistics for the group sharing the grouping identifier; and if the group statistics compilation module is unable to locate a group within the group data storage sharing a grouping identifier corresponding to the grouping identifier associated with a given query, then the group data storage is operable to create a new group entry within the group data storage to store processing statistics associated with the given query.

2. The diagnostic system as claimed in claim 1, wherein the query optimizer is a costbased query optimizer operable to optimize each query and assign a projected processing cost to each query, and wherein the grouping module comprises a generator for generating a grouping identifier correlated to the cost for the query.

3. The diagnostic system as claimed in claim 1, wherein the grouping module comprises a signature generation module configured to receive the query execution plan and to generate the corresponding grouping identifier.

4. The diagnostic system as claimed in claim 3, wherein the query optimizer is a costbased query optimizer.

5. The diagnostic system as claimed in claim 3, wherein the query optimizer is a rulebased query optimizer.

6. The diagnostic system as claimed in claim 3, wherein the grouping module is configured to receive binary coding words corresponding to the query execution plan.

7. The diagnostic system as claimed in claim 6, wherein the grouping module is configured to fold the words together to generate the grouping identifier by the process of linear feedback shift register.

8. The diagnostic system as claimed in claim 6, wherein the grouping module is configured to fold the words together to generate the grouping identifier by the process of CRC32 checksum.

9. The diagnostic system as claimed in claim 6, wherein the grouping module is configured to fold the words together to generate the grouping identifier by applying the logical operator, XOR, to the words.

10. The diagnostic system as claimed in claim 1, wherein the processing statistics relate to resource usage by the database system in resolving a corresponding query.

11. A program product stored on a computer readable medium, the program product comprising instructions operable to cause a processor to:

determine a query execution plan corresponding to each query received by a database system;

generate a corresponding grouping identifier for each query based on the corresponding query execution plan and assign the corresponding grouping identifier to each query;

obtain processing statistics corresponding to each query;

compile the processing statistics for each query by the query's grouping identifier;

store the compiled processing statistics; and wherein:

the instructions to compile the processing statistics include instructions to locate a group within a group data storage sharing a grouping identifier corresponding to the grouping identifier associated within a given query and update processing statistics for the group sharing the grouping identifier; and if a group is not located within the group data storage sharing a grouping identifier corresponding to the grouping identifier associated within a given query, then the instructions to store the processing statistics includes instructions to create a new group entry within the group data storage to store processing statistics associated with the given query.

12. The program product of claim 11, wherein the instructions to generate a query execution plan include instructions to generate a cost based query execution plan and assign a projected processing cost to each query.

13. The program product of claim 11, wherein the instructions to generate a query execution plan include instructions to generate a rule-based query execution plan and reference one or more optimization rules to generate the query execution plan.

14. The program product of claim 11, further comprising instructions to receive binary coding words corresponding to the query execution plan.

15. The program product of claim 14, further comprising instructions to fold the words together to generate the grouping identifier by the process of linear feedback shift register.

16. The program product of claim 14, further comprising instructions to fold the words together to generate the grouping identifier by the process of CRC32 checksum.

17. The program product of claim 14, further comprising instructions to fold the words together to generate the grouping identifier by applying the logical operator, XOR, to the words.

18. The program product of claim 11, wherein the computer readable medium comprises a modulated carrier signal.

19. The program product of claim 11, wherein the computer readable medium comprises a storage medium.

20. The program product of claim 11, wherein the instructions to obtain processing statistics include instructions to obtain processing statistics related to resource usage by the database system in resolving a corresponding query.

* * * * *